United States Patent
Arnold et al.

(10) Patent No.: US 7,118,814 B1
(45) Date of Patent: Oct. 10, 2006

(54) APPARATUS AND METHOD FOR STEP-STABILIZATION OF GMR-BASED READ SENSORS

(75) Inventors: Carl Stephen Arnold, Golden, CO (US); Edward Virgil Denison, Erie, CO (US); John P. Nibarger, Superior, CO (US); Carl A. Helms, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 52 days.

(21) Appl. No.: 10/791,257

(22) Filed: Mar. 2, 2004

(51) Int. Cl.
 *G11B 5/127* (2006.01)
 *G11B 5/39* (2006.01)
(52) U.S. Cl. ............... 428/811.5; 428/815; 360/324.12
(58) Field of Classification Search ............ 428/811.5
 See application file for complete search history.

(56) References Cited

U.S. PATENT DOCUMENTS

| | | | | |
|---|---|---|---|---|
| 4,477,794 A | * | 10/1984 | Nomura et al. | 338/32 R |
| 5,680,091 A | * | 10/1997 | Maeda et al. | 338/32 R |
| 5,923,503 A | * | 7/1999 | Sato et al. | 360/327 |
| 6,118,621 A | * | 9/2000 | Ohsawa et al. | 360/327 |
| 6,134,091 A | * | 10/2000 | Toki et al. | 360/324.11 |
| 6,157,525 A | * | 12/2000 | Iwasaki et al. | 360/324.12 |
| 6,307,722 B1 | * | 10/2001 | Sato et al. | 360/324.12 |
| 6,327,121 B1 | * | 12/2001 | Nagasawa et al. | 360/324.11 |
| 6,396,668 B1 | * | 5/2002 | Mao et al. | 360/314 |
| 6,411,478 B1 | * | 6/2002 | Mao et al. | 360/324.2 |
| 6,606,782 B1 | * | 8/2003 | Min et al. | 29/603.15 |
| 6,707,648 B1 | * | 3/2004 | Itoh et al. | 360/322 |
| 2001/0026425 A1 | * | 10/2001 | Miyazawa et al. | 360/327.31 |
| 2003/0104249 A1 | * | 6/2003 | Okuno et al. | 428/693 |
| 2004/0008455 A1 | * | 1/2004 | Hasegawa et al. | 360/324.12 |
| 2004/0067389 A1 | * | 4/2004 | Hasegawa et al. | 428/692 |

* cited by examiner

*Primary Examiner*—Kevin M. Bernatz
(74) *Attorney, Agent, or Firm*—Yee & Associates, P.C.

(57) ABSTRACT

An apparatus and method for step-stabilization of giant magnetoresistive (GMR) based read heads are provided. With the apparatus and method, gratings or periodic structures are generated in the underlayer of the magnetoresistive (MR) sensor stack and the edges, or "steps", in these structures are the magnetically active features. These "steps" are oriented approximately parallel to the desired bias direction and provide a restoring force towards the bias direction for any perturbations, whether intrinsic or extrinsic. In the case of a GMR sensor, where the easy axis is parallel to the permanent magnet set direction, these stabilizer steps are oriented parallel to the magnetization direction of the permanent magnets.

17 Claims, 4 Drawing Sheets

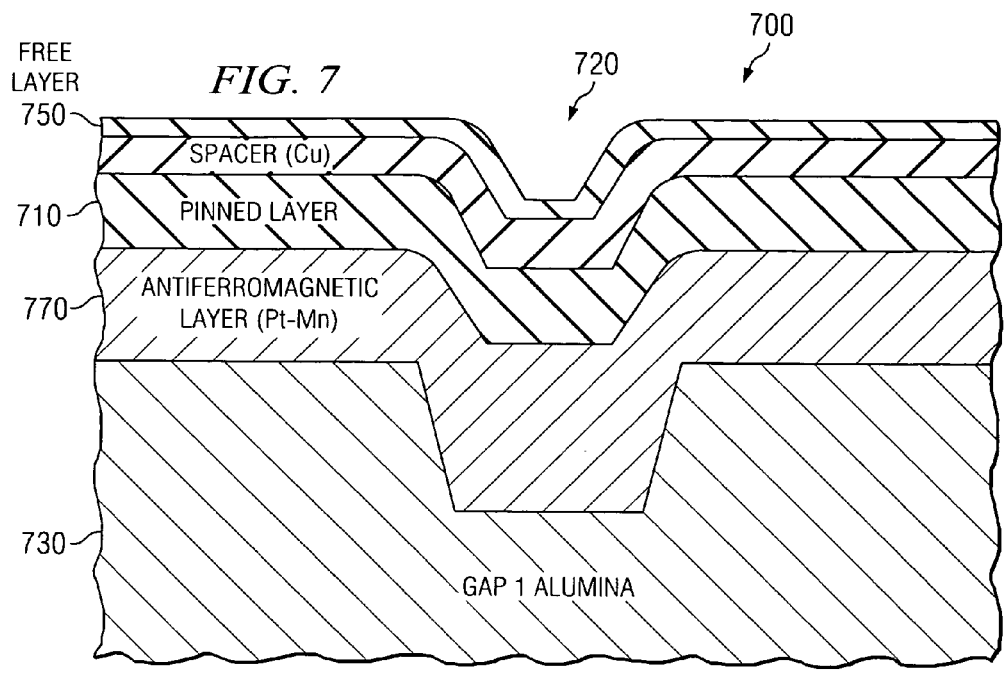
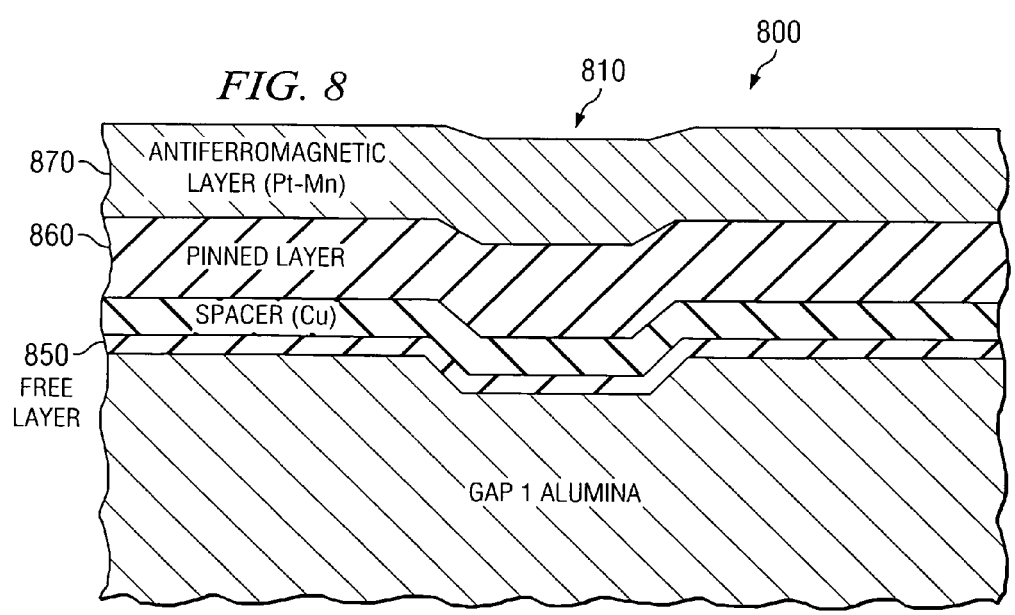

APPARATUS AND METHOD FOR STEP-STABILIZATION OF GMR-BASED READ SENSORS

BACKGROUND OF THE INVENTION

1. Field of the Invention

The present invention is generally directed to read sensors for reading data from magnetic media. More specifically, the present invention is directed to a mechanism for stabilizing a giant magnetoresistive based read sensor in a read/write head of a magnetic media device.

2. Background of the Invention

The requirement of high density magnetic storage of data on magnetic tape and hard disk drives has been increasing steadily for the past several years. Magnetic tape and hard disk drives include magnetic heads for reading and writing data to the magnetic media. The magnetic heads include write coils and sensors for reading data from the magnetic media.

Development of magnetoresistive (MR) sensors (also referred to as heads) for magnetic media drives in the early 1990's allowed magnetic media drive products to maximize storage capacity with a minimum number of components (heads, disks, etc.). Fewer components result in lower storage costs, higher reliability, and lower power requirements for the magnetic media drives.

MR sensors are used for the read element of a read/write head on a high-density magnetic media drive. MR sensors read magnetically encoded information from the magnetic medium by detecting magnetic flux stored in the magnetic medium. As storage capacity of magnetic media drives has increased, the storage bit has become smaller and its magnetic field has correspondingly become weaker. MR heads are more sensitive to weaker magnetic fields than are the inductive read coils used in earlier magnetic media drives. Thus, there has been a move away from inductive read coils to MR sensors for use in magnetic media drives.

During operation of the magnetic media drive, sense current is passed through the MR element of the sensor causing a voltage drop. The magnitude of the voltage drop is a function of the resistance of the MR element. Resistance of the MR element varies in the presence of a magnetic field. Therefore, as the magnitude of the magnetic field flux passing through the MR element varies, the voltage across the MR element also varies. Differences in the magnitude of the magnetic flux entering the MR sensor can be detected by monitoring the voltage across the MR element.

As discussed above, MR sensors are known to be useful in reading data with a sensitivity exceeding that of inductive or other thin film sensors. However, sensor failures with respect to magnetic domain nucleation and bias-point variation are a leading cause of yield loss in the fabrication of MR sensors. Tape head applications, as opposed to disk, are especially demanding with respect to sensor yield. This is because a tape head integrates many MR sensors, all of which must yield for the head to yield.

With each new generation of product, track widths are narrowed and the number of sensors per head increase. Because of the magnetics in read head sensors, and the trend to increase the number of sensors per head, a change in MR technology from anisotropic magnetoresistive (AMR) read head sensors to giant magnetoresistive (GMR) read head sensors, also known as spin valves, is anticipated. In an MR sensor, such as an AMR sensor, a resistance change is caused by an intrinsic property of the sensing layer. In a GMR sensor, however, a resistance change is caused by the quantum nature of electrons. GMR sensors may have up to ten times the sensitivity of AMR sensors.

AMR and GMR sensors are composed of multiple thin films. Both sensors have a sensing layer that responds to external magnetic fields. In the absence of an external magnetic field, this sensing layer will spontaneously magnetize itself parallel with the long axis of this layer. A fixed magnetic field ("horizontal bias") is also applied in this direction by hard bias films to establish a single magnetic domain in the sensing layer. This single magnetic domain minimizes domain noise and promotes consistent reading. This sensing layer's magnetic orientation, referenced to the magnetic media, rotates from parallel to perpendicular when an increasing perpendicular magnetic field ("transverse magnetic field") is applied. This field is composed of a varying external magnetic field from the magnetic media and fixed internal magnetic fields ("transverse bias") from other parts of the sensor.

The domain instabilities and bias-point variation of AMR read head sensors degrade with decreasing track width. Studies of AMR read head sensors indicate that the most likely cause in bias-point variation of these types of read heads is the type of permanent magnet technology that AMR sensors are constrained to use based on existing wafer film deposition systems. In addition to the intrinsic permanent magnet driven variations, extrinsic magnetic perturbations caused by scratches across the AMR sensor or electrostatic discharge (ESD) events are common causes of failures of these sensors.

Thus, it would be beneficial to have an apparatus and method for minimizing these instabilities and bias-point variations in read head sensors. More specifically, it would be beneficial to have an apparatus and method for minimizing these sources of failure in giant magnetoresistive (GMR) read head sensors.

SUMMARY OF THE INVENTION

The present invention provides an apparatus and method for step-stabilization of magnetoresistive (MR) based read heads. With the apparatus and method of the present invention, gratings or periodic structures are generated in the underlayer of the MR sensor stack and the edges, or "steps", in these structures are the magnetically active features. These "steps" are oriented approximately parallel to the desired bias direction and provide a restoring force towards the bias direction for any perturbations, whether intrinsic or extrinsic. In the case of a giant magnetoresistive (GMR) sensor, where the easy axis is parallel to the permanent magnet set direction, these stabilizer steps are oriented parallel to the magnetization direction of the permanent magnets.

The periodic structures or gratings may be placed in various places within the sensor stack of a GMR sensor depending on whether the GMR sensor, otherwise known as a spin valve sensor, is a top or bottom spin valve sensor. A top spin valve sensor and a bottom spin valve sensor are essentially inverted versions of one another with the pinned layer on either the "top" for a top spin valve sensor, or the "bottom" for a bottom spin valve sensor. Because of smoothing of the edges or "steps" due to multiple layers of deposition, the depth of the depressions used to generate the grating or periodic structures is much greater for the bottom spin valve than the top spin valve. This is because added depth of the depressions tends to compensate for the effect of edge smoothing due to layer deposition.

The stabilizer steps in either the top spin valve sensor or the bottom spin valve sensor are formed in a layer adjacent to either the free layer or the pinned layer in order to optimize the sidewall definition of the grating while minimizing the depth requirements and rounding effects of subsequent depositions. In the case of a bottom spin valve, the stabilizer steps may be patterned in the anti-ferromagnetic layer, e.g., the platinum-manganese layer or Gap 1 Alumina layer. In the case of top spin valve sensors, the stabilizer steps are formed in the Gap 1 Alumina layer.

The stabilizer grating generated using the present invention has an effect on the damping of the magnetization dynamics of the magnetoresistive sensor. The larger the magnetic damping, the faster the sensor returns to its equilibrium state. By using a stabilizer grating formed according to the present invention, the magnetic damping of the system is increased, which in turn increases the response time of the sensor. By changing the period and/or depth of the grating, the magnetic response time in the magnetic-sensor may be changed to allow tuning of the response properties of the sensor.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary diagram illustrating the layer configuration of a bottom spin valve sensor in accordance with one exemplary embodiment of the present invention; and FIG. 8 is an exemplary diagram illustrating a layer configuration of a top spin valve sensor in accordance with one exemplary embodiment of the present invention.

DETAILED DESCRIPTION OF THE PREFERRED EMBODIMENT

Figure 1:
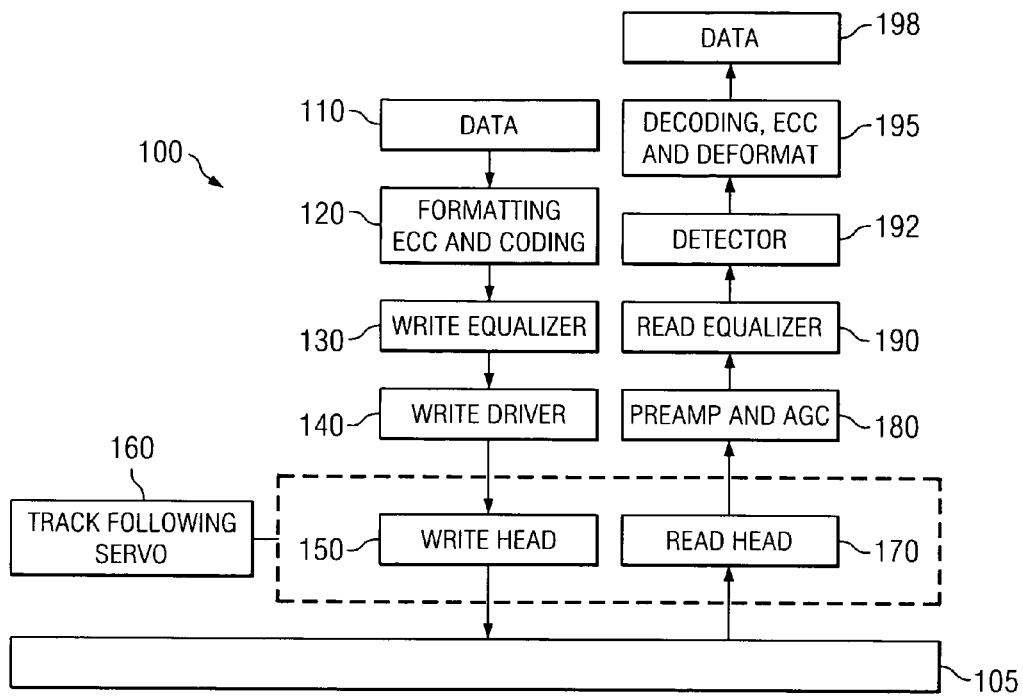
FIG. 1 depicts a block diagram of a data recording system in which the present invention may be implemented.

With reference now to the figures, and in particular with reference to FIG. 1, a block diagram of a data tape recording system in which the present invention may be implemented is illustrated. Data recording system 100 is an example of a tape recording system that can record data from a host computer onto magnetic tape. While a magnetic tape recording system is depicted in FIG. 1, the depiction of a magnetic tape recording system is only intended to be illustrative. It should be appreciated that the present invention is not limited to use with magnetic tape and any magnetic media system may make use of the aspects of the present invention without departing from the spirit and scope of the present invention.

User data 110 enters the system 100 to be written to magnetic tape media. The data is formatted and encoded 120, passed through a write equalizer circuit 130 (if necessary), and fed to the writing head 150 by means of a write driver 140 which supplies the electric current signals required for recording on the magnetic tape medium 105.

When reading the recorded data from the magnetic tape medium 105, the magnetic tape medium 105 is passed by a read head 170 in which the present invention may be implemented, as discussed hereafter. The read head 170 transforms the magnetic flux emanating from the magnetic tape medium into electric voltage signals by means of the magnetoresistive effect. These voltages are amplified by preamp and AGC 180 and amplitude equalized by read equalizer 190 before being passed into a detector 192 that interprets the signals as digital data. The data is un-encoded using decoding ECC and deformater 195 and the user data 198 is restored to the host computer. In a preferred embodiment, the read head 170 employs one or more giant magnetoresistive sensors to transform the magnetic flux into electric voltage signals.

Figure 2A:
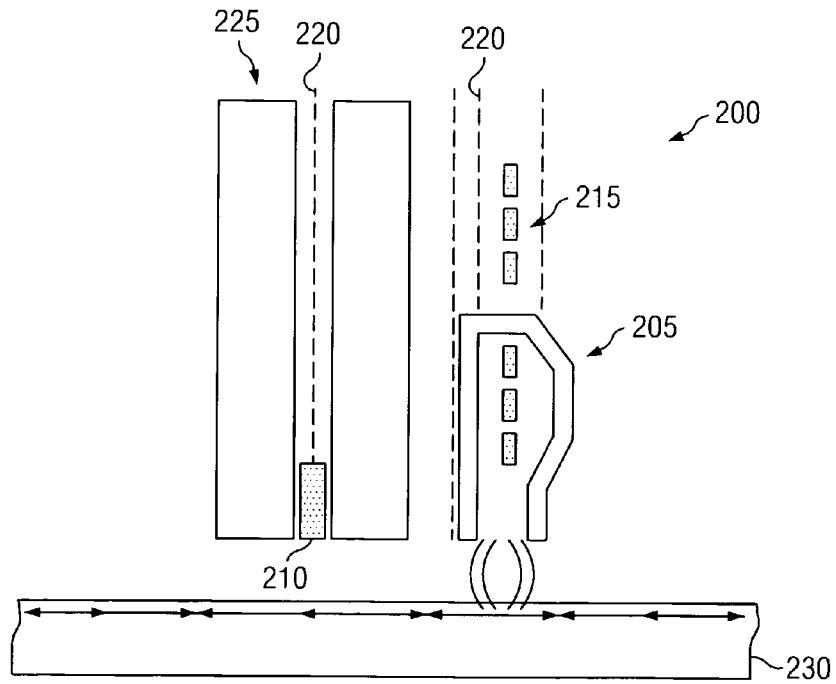
FIGS. 2A and 2B are exemplary block diagrams illustrating a spin valve sensor in a magnetic read/write head in accordance with embodiments of the present invention.
Figure 2B:
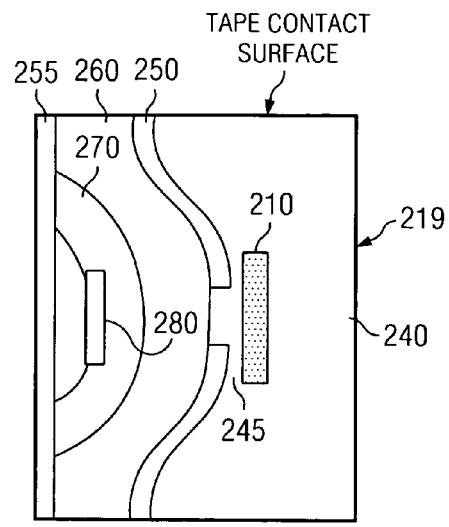

FIGS. 2A and 2B show cross sections of a magnetic head 200 having a magnetoresistive (MR) sensor, which in the depicted example is a giant magnetoresistive (GMR), such as GMR sensor 210, also known as a spin valve sensor and referred to as such hereafter. As shown in FIG. 2A, the magnetic head 200 includes an adjacent write head yoke 205, a spin valve sensor 210, coils 215, layered dielectrics 220, and magnetic shields 225. The magnetic head 200 is positioned above but in contact with a magnetic tape media 230. A gap between the magnetic head 200 and the magnetic tape media 230 is shown in FIG. 2A for clarity only. The coils 215 generate a magnetic field for writing data to the magnetic tape media 230. The coils 215 are wrapped around yoke 205 which focuses the magnetic field created by the coils 215. The spin valve sensor 210 is used for reading data from the magnetic tape media 230. The layered dielectrics 220 are used as an insulator for electrically insulating the spin valve sensor 210 from the magnetic shields 225. The magnetic shields 225 shield the spin valve sensor from upstream and downstream bits during the read operation.

FIG. 2B shows a magnified view of a yoke style spin valve read head. The read head 219 includes a magnetoresistive spin valve element 210, i.e. spin valve sensor 210, positioned between two layers of an overcoat insulating material 240 and 245. The magnetoresistive spin valve element 210 is in close proximity to a top flux guide 250. The top flux guide 250 is separated from a bottom flux guide 255 by a gap insulator 260, planars 270, and bias conductor 280.

When the magnetoresistive spin valve sensor, also known as a spin valve element, 210 is formed, a magnetic field is typically applied in a direction parallel to the plane of the spin valve element 210. Thus, the spin valve element 210 exhibits a uniaxial anisotropy with an easy-axis of magnetization parallel to the direction of the applied field. As a magnetic tape media passes the spin valve read head, an external magnetic field is conducted by the top flux guide 250 and the bottom flux guide 255 to generate a magnetic field that is applied normal to the easy-axis of the sensing layer of the spin valve element 210. The gap insulator 260, planars 270 and bias conductor 280 aid in conducting the magnetic flux from the magnetic tape media so that it is applied normal to the easy axis of the sensing layer of the spin valve element 210.

Figure 3:
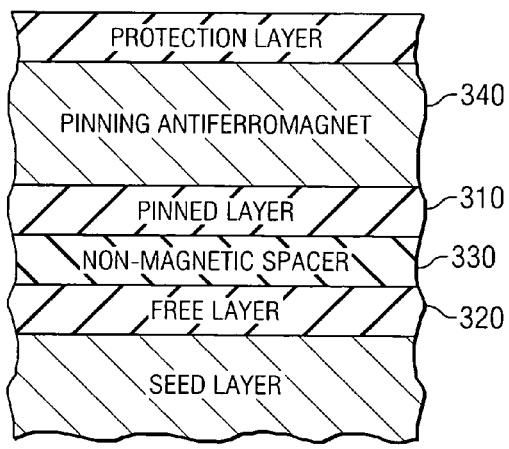
FIGS. 3 and 4 are exemplary diagrams of layer configurations that may comprise a spin valve sensor.
Figure 4:
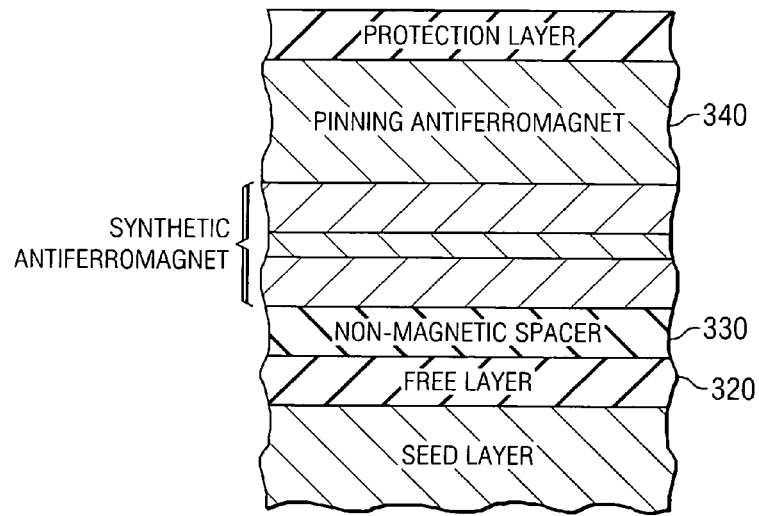

The spin valve sensor in these head structures is briefly described as follows. Referring to FIGS. 3 and 4, the spin valve is a layered structure based on two ferromagnetic layers 310 and 320 (for example, NiFe or CoFe) separated by a thin non-magnetic layer 330 (e.g., copper). One of the ferromagnetic layers 310 has its magnetization pinned, i.e. fixed, at 90 degrees with respect to the other ferromagnetic layer's 320 longitudinal oriented easy axis. This is called the pinned layer 310 and is held in place by the exchange field from an adjacent antiferromagnet 340 (such as NiO, PtMn or NiMn). The second ferromagnetic layer 320 has its magnetization free to rotate for sensing applied magnetic fields and is called the free or sensing layer.

Figure 5:
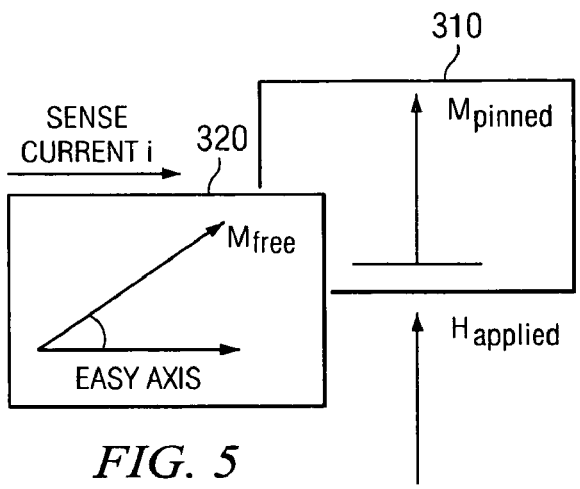
FIG. 5 is an exemplary diagram illustrating the manner by which the pinned and free layers of a spin valve sensor operate in the presence of an applied field.

FIGS. 3 and 4 are two embodiments of spin valves with different types of antiferromagnet/ferromagnet arrangements to achieve the same end. A diagram of the magnetic situation is shown in FIG. 5. In response to an external magnetic field $H_{applied}$ being applied normal to the easy axis of the spin valve element free layer, the magnetization direction of the free layer rotates away from the easy axis direction toward the direction of the applied field. This magnetization rotation causes the electrical resistance of the spin valve element to change. Based on changes in the resistance of the MR spin valve element and thus, the voltage output seen in the presence of a sense current i, the data recording on the magnetic tape can be read.

As mentioned above, intrinsic and extrinsic factors affect the magnetic domain nucleation and bias-point variation in magnetoresistive read head sensors, such as anisotropic magnetoresistive (AMR) sensors. It is anticipated that similar problems encountered with AMR sensors may affect other types of magnetoresistive sensors, such as GMR sensors, as they are more prevalently used with magnetic media read head devices. This is because both sensors make use of similar permanent magnets. These problems lead to a lower yield of the GMR sensors and thus, a higher failure of GMR sensors. Currently, an acceptable failure rate is approximately 7 out of every 10,000 sensors. In the future, as more sensors are packed into read heads in order to accommodate smaller track widths and higher data density on magnetic media, a failure rate of only 7 out of every 100,000 sensors will be acceptable.

Therefore, the present invention provides an apparatus and method for step-stabilization of magnetoresistive (MR) based read heads, such as giant magnetoresistive (GMR) based read heads, in order to reduce the affect of intrinsic and extrinsic factors on the magnetic domain nucleation and bias-point variation of the GMR sensors and thereby, increase the yield of the sensors. With the apparatus and method of the present invention, gratings or periodic structures are generated in the underlay of the MR sensor stack and the edges, or "steps", in these structures are the magnetically active features. These "steps" are oriented approximately parallel to the desired bias direction and provide a restoring force towards the bias direction for any perturbations, whether intrinsic or extrinsic. In the case of a GMR sensor, where the easy axis is parallel to the permanent magnet set direction, these stabilizer steps are oriented parallel to the magnetization direction of the permanent magnets.

Figure 6:
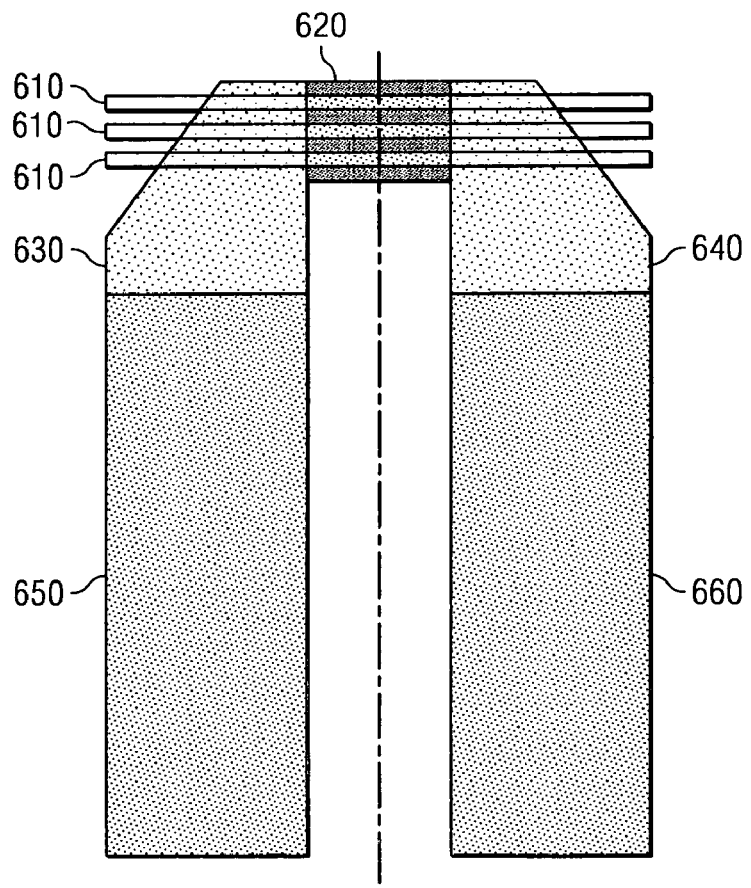
FIG. 6 is an exemplary diagram illustrating the orientation of stabilizers relative to the sensor in the film plane according to one exemplary embodiment of the present invention.

FIG. 6 is an exemplary diagram illustrating a grating structure in accordance with one exemplary embodiment of the present invention. As shown in FIG. 6, a plurality of stabilizer depressions 610 are formed in the layers of the magnetoresistive (MR) element 620. These stabilizer depressions 610 may be formed, for example, by milling out a depression in one or more of the layers of the MR element 620 with subsequent layers being deposited thereon. The stabilizer depressions 610 are preferably milled in a direction that is parallel to the direction of magnetization, i.e. the edges of the depressions run parallel to the direction of magnetization. In a GMR sensor, the magnetization direction is parallel to the long axis of the GMR sensor and perpendicular to the magnetic media. Thus, the stabilizer depressions 610 will also be oriented such that they are parallel to the long axis of the GMR sensor and perpendicular to the magnetic media.

The stabilizer depressions 610, being aligned with the original direction of magnetization of the sensor, i.e. the bias direction, serve to maintain the magnetic field of the sensor in the bias direction. This is because the magnetic field does not like to point into the edges of the stabilizer depressions 610. The edges of the stabilizer depressions 610 essentially impart a restoring force on the magnetic field to return it to an alignment parallel with the bias direction.

Thus, when a perturbation is caused in the magnetic field of the sensor, such as through the application of an external magnetic field, e.g., from a magnetic media, the magnetic field of the sensor will rotate away from the bias direction and thereby generate a voltage that is used to read the data written on the magnetic media. The edges of the stabilizer depressions 610 of the present invention serve to restore the magnetic field of the sensor to alignment with the bias direction when the external magnetic field is no longer present. In this way, the magnetic domain nucleation and bias-point variation experienced in other MR sensors is reduced in the MR sensor of the present invention. It should be appreciated that the same restoring force discussed above operates on both intrinsic and extrinsic perturbations in the magnetic field of the sensor.

In one exemplary embodiment, the stabilizer structure, i.e. the grating structure having the stabilizer depressions, shown in FIG. 6 is positioned under the permanent magnets 630–640 and conductor legs 650–660. By placing the stabilizer structure under the permanent magnets 630–640, the capability of the permanent magnets 630–640 may be improved. That is, it is preferred that the permanent magnets maintain the magnetic field in the direction of the easy axis of the free layer, however, the permanent magnets often have no preferred direction, they are isotropic. As a result, perturbations, such as thermal asperity, e.g., heating up of the head due to a bump on the magnetic media, can cause the magnetization direction of the permanent magnets to change. With the present invention, by extending the stabilizers under the permanent magnets 630–640, the same mechanism that stabilizes the MR element 620 defines a preferred direction for the permanent magnets 630–640 and thus, improves the magnetic capability of the permanent magnets.

As mentioned previously, the GMR sensor is comprised of a plurality of layers of material which is referred to as the sensor stack. The periodic structures or gratings of the present invention may be placed in various places within the sensor stack depending on the type of sensor that is being formed. That is, depending on whether the GMR sensor, or spin valve sensor, is a top or bottom spin valve sensor, different options for placement, or forming, of the stabilizer depressions are possible.

The selection of the layers of the sensor stack in which the stabilizer depressions may be formed is primarily based on the need to avoid smoothing of the edges of the stabilizer depressions. This is because smoothing of the edges of the depression tends to reduce the affect of the stabilizer depression on the magnetic field and thus, the restoring nature of the stabilizer depressions is eroded.

Smoothing of the edges occurs when the stabilizer depression is formed in a first layer of the sensor stack and subsequent layers of the sensor stack are deposited on top of the first layer. With each subsequent layer that is deposited, the corners and angles of the edges of the stabilizer depression are rounded and reduced. In order to provide sufficient restoring forces for the magnetic field, either smoothing of the edges of the stabilizer depressions needs to be avoided, or the depth of the stabilizer depressions must be such that the depth compensates for the smoothing of the edges.

As mentioned above, with a GMR sensor, otherwise known as a spin valve sensor, the layers of the sensor stack in which the stabilizer depressions of the present invention may be formed without encountering too much smoothing depends on the type of spin valve sensor being formed, i.e. whether the spin valve sensor is a top spin valve sensor or a bottom spin valve sensor.

FIG. 7 is an exemplary diagram illustrating the layer configuration of a bottom spin valve sensor in accordance with one exemplary embodiment of the present invention. FIG. 8 is an exemplary diagram illustrating a layer configuration of a top spin valve sensor in accordance with one exemplary embodiment of the present invention. A top spin valve sensor 700 and a bottom spin valve sensor 800 are essentially inverted versions of one another with the pinned layer 710, 860 on either the "top" for a top spin valve sensor, or the "bottom" for a bottom spin valve sensor. Because of smoothing of the edges due to multiple layers of deposition, the depth of the stabilizer depressions used to generate the stabilizer structure is much greater for the bottom spin valve than the top spin valve. This is because added depth of the depressions tends to compensate for the effect of edge smoothing due to layer deposition.

The effect of this smoothing is shown in FIG. 7 where it is assumed that the stabilizer depression 720 is formed in the Gap 1 Alumina layer 730. As shown in FIG. 7, as with each additional layer above the Gap 1 Alumina Layer 730, the depth of the stabilizer depression 720, the angle of the edges of the stabilizer depression 720, and the sharpness of the corners of the stabilizer depression 720 is lessened. In order to compensate for this smoothing, the originally milled or formed depression must have a sufficient depth such that after smoothing, the desired affect on the magnetic field of the free layer 750 is achieved by the smoothed stabilizer depression. Thus, for a bottom spin valve 700, the stabilizer depression must have a larger depth when compared to a top spin valve 800.

As shown in FIG. 8, the depth of the stabilizer depression 810 is much smaller. This is because the free layer is adjacent the Gap 1 Alumina and thus, the number of layers deposited over the layer in which the stabilizer depression 810 is formed is only one. In other words, the amount of smoothing is minimal in the top spin valve 800 and thus, the stabilizer depression need not have a large depth.

The stabilizer depressions, in either the top spin valve sensor 700 or the bottom spin valve sensor 800, are preferably formed in a layer adjacent to either the free layer 750, 850 or the pinned layer 760, 860 in order to optimize the sidewall definition of the grating while minimizing the depth requirements and rounding effects of subsequent depositions. In the case of a bottom spin valve 700, the stabilizer depressions may be patterned in the anti-ferromagnetic layer, e.g., the platinum-manganese layer 770 or the Gap 1 Alumina layer 730. Alternatively, the stabilizer depression 710 may be formed in other layers of the sensor stack including the Copper spacer layer, the pinned layer, and the like.

In the case of top spin valve sensors 800, the stabilizer depressions 810 are preferably formed in the Gap 1 Alumina layer. Although FIGS. 7 and 8 illustrate the grating being created in the Gap 1 Alumina, the present invention is not limited to such as noted above. The important consideration is that the grating is generated in a layer of the sensor stack such that the "step" of the grating is experienced by the magnetic field of the free layer. Generating the grating in some layers may be more problematic than others since milling the grating may require that the vacuum created during deposition be broken in order to perform the milling. Some layers require deposition without breaking the vacuum and thus, would not be the best candidates for generating the grating.

In addition to the restorative forces generated by the stabilizer depressions of the present invention, the stabilizer grating generated using the present invention has an effect on the damping of the magnetization dynamics of the GMR sensor. The larger the magnetic damping, the faster the sensor returns to its equilibrium state. By using a stabilizer grating formed according to the present invention, the magnetic damping of the system is increased, which in turn increases the response time of the sensor. By changing the period and/or depth of the grating, the magnetic response time in the magnetic sensor may be changed thereby allowing tuning of the response properties of the sensor. "Tuning" in the sense of the present invention refers to changing the intrinsic dynamic properties of the free layer to improve the high speed response.

Thus, the present invention provides a mechanism by which restorative forces are generated in a GMR sensor such that the magnetic field of the free layer in the GMR sensor is returned to an alignment with a bias direction following a perturbation to the magnetic field by either an intrinsic or extrinsic influence. The mechanism involves the use of stabilizer depressions formed in a layer of the sensor stack whose edges serve to impart this restorative force. In addition, the edges of the stabilizer depression also provide a dampening affect on the sensor, as discussed previously. The forming or milling of these stabilizer depressions results in a stabilizer grating that is comprised of periodic structures that act to maintain the direction of the magnetic field of the free layer of the sensor to be parallel with a bias direction.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetoresistive sensor, comprising: a plurality of sensor stack layers, wherein the plurality of sensor stack layers includes at least a pinned magnetic layer and a free layer; and at least one stabilizer depression formed in one sensor stack layer within the plurality of sensor stack layers, wherein the at least one stabilizer depression is located at least in the free magnetic layer and imparts a restorative force on a magnetic field of the free layer of the magnetoresistive sensor to align the magnetic field with a bias direction, wherein the magnetic field of the free layer aligned with the bias direction is longitudinally oriented parallel to the plane of the magnetoresistive sensor and each of the at least one stabilizer depressions consists of two edges elevated above a depressed center portion, wherein the edges run parallel to the direction of magnetization of said free layer and perpendicular to the surface of a magnetic media when the magnetic media is read by the magnetoresistive sensor.

2. The magnetoresistive sensor of claim 1, wherein the magnetoresistive sensor is a top spin valve sensor.

3. The magnetoresistive sensor of claim 1, wherein the magnetoresistive sensor is part of a magnetic media read head.

4. The magnetoresistive sensor of claim 1, wherein the magnetoresistive sensor is a bottom spin valve sensor.

5. A magnetoresistive sensor, comprising: a plurality of sensor stack layers, wherein the plurality of sensor stack layers includes at least a pinned magnetic layer and a free layer; and at least one stabilizer depression formed in one sensor stack layer within the plurality of sensor stack layers, wherein the at least one stabilizer depression is located at least in the free magnetic layer and imparts a restorative force on a magnetic field of the free layer of the magnetoresistive sensor to align the magnetic field with a bias direction; wherein the magnetoresistive sensor is a bottom spin valve sensor, wherein the magnetic field of the free layer aligned with the bias direction is longitudinally oriented parallel to the plane of the magnetoresistive sensor and each of the at least one stabilizer depressions consists of two edges elevated above a depressed center portion, wherein the edges run parallel to the direction of magnetization of said free layer and perpendicular to the surface of a magnetic media when the magnetic media is read by the magnetoresistive sensor.

6. The magnetoresistive sensor of claim 5, wherein the one sensor stack layer is one of an antiferromagnetic layer and a pinned layer.

7. The magnetoresistive sensor of claim 5, wherein the one sensor stack layer is a Gap 1 Alumina layer.

8. The magnetoresistive sensor of claim 5, wherein the one sensor stack layer is a sensor stack layer adjacent one of the free layer and a pinned layer, the pinned layer being a layer in the plurality of sensor stack layers.

9. The magnetoresistive sensor of claim 5, wherein the at least one stabilizer depression is formed under a permanent magnet.

10. The magnetoresistive sensor of claim 5, wherein the at least one stabilizer depression is formed in the one sensor stack layer by milling the at least one stabilizer depression in the one sensor stack layer, and wherein other sensor stack layers of the plurality of sensor stack layers are deposited on the milled one sensor stack layer.

11. The magnetoresistive sensor of claim 10, wherein the at least one stabilizer depressions have a depth such that after deposition of the other sensor stack layers on the milled one sensor stack layer, the magnetic field of the free layer of the magnetoresistive sensor experiences restorative forces due to the at least one stabilizer depression.

12. A method of providing a magnetoresistive sensor, comprising: providing at least one stabilizer depression formed in one sensor stack layer within a plurality of sensor stack layers, wherein the plurality of sensor stack layers includes at least a pinned magnetic layer and a free layer wherein the at least one stabilizer depression is located at least in the free magnetic layer and imparts a restorative force on a magnetic field of the free layer of the magnetoresistive sensor to align the magnetic field with a bias direction, wherein the magnetic field of the free layer aligned with the bias direction is longitudinally oriented parallel to the plane of the magnetoresistive sensor and each of the at least one stabilizer depressions consists of two edges elevated above a depressed center portion, wherein the edges run parallel to the direction of magnetization of said free layer and perpendicular to the surface of a magnetic media when the magnetic media is read by the magnetoresistive sensor.

13. The method of claim 12, wherein the magnetoresistive sensor is a top spin valve sensor.

14. The method of claim 12, wherein the magnetoresistive sensor is a bottom spin valve sensor.

15. The method of claim 12, wherein the magnetoresistive sensor is provided in a magnetic media read head.

16. The method of claim 12, wherein providing the at least one stabilizer depression includes forming the at least one stabilizer depression in the one sensor stack layer by milling the at least one stabilizer depression in the one sensor stack layer, and wherein providing the plurality of layers includes depositing other sensor stack layers of the plurality of sensor stack layers on the milled one sensor stack layer.

17. The method of claim 16, wherein providing the at least one stabilizer depression includes milling the one or more stabilizer depressions to have a depth such that after deposition of the other sensor stack layers on the milled one sensor stack layer, the magnetic field of the free layer of the magnetoresistive sensor experiences restorative forces due to the at least one stabilizer depression.

* * * * *